(12) United States Patent
Chauvet et al.

(10) Patent No.: US 7,744,472 B2
(45) Date of Patent: Jun. 29, 2010

(54) SHARK DETERRENT DEVICE

(75) Inventors: Jacques Chauvet, New York, NY (US); David Conroy, Brooklyn, NY (US)

(73) Assignee: Triton Artificial Reef, LLC, Cortland Manor, NY (US)

( * ) Notice: Subject to any disclaimer, the term of this patent is extended or adjusted under 35 U.S.C. 154(b) by 235 days.

(21) Appl. No.: 11/812,595

(22) Filed: Jun. 20, 2007

(65) Prior Publication Data

US 2008/0076582 A1 Mar. 27, 2008

Related U.S. Application Data

(63) Continuation-in-part of application No. 10/959,120, filed on Oct. 7, 2004, now abandoned.

(60) Provisional application No. 60/508,873, filed on Oct. 7, 2003.

(51) Int. Cl.
*F41B 15/02* (2006.01)
(52) U.S. Cl. .................................. 463/47.7
(58) Field of Classification Search ............... 463/47.2, 463/47.7; 135/69, 75, 78; 119/801, 806; 43/5, 6; 362/102
See application file for complete search history.

(56) References Cited

U.S. PATENT DOCUMENTS

| | | | |
|---|---|---|---|
| 1,442,813 A * | 1/1923 | Lobit ................... 43/18.1 CT |
| 2,257,227 A * | 9/1941 | Dater .................... 362/102 |
| 2,291,593 A * | 7/1942 | Hubbard ................. 294/19.1 |
| 2,427,841 A * | 9/1947 | Morris .................. 403/109.3 |
| 2,757,002 A * | 7/1956 | Ryden ....................... 43/4 |
| 2,984,852 A * | 5/1961 | George .................... 15/144.4 |
| 3,150,460 A * | 9/1964 | Dees ......................... 43/4 |
| 3,354,572 A * | 11/1967 | Dean ......................... 43/6 |
| 3,737,649 A * | 6/1973 | Nelson et al. ............. 362/102 |
| 4,037,839 A * | 7/1977 | Nelson .................... 463/47.7 |
| 4,667,431 A * | 5/1987 | Mendicino .................. 43/6 |
| 4,793,646 A * | 12/1988 | Michaud, Jr. ............. 294/19.1 |
| 4,819,137 A * | 4/1989 | Hamilton ................. 362/102 |
| 4,881,338 A * | 11/1989 | Lung ......................... 43/5 |
| 5,509,653 A * | 4/1996 | Parsons .................. 463/47.7 |
| 5,630,381 A * | 5/1997 | Kroyer .................... 119/801 |
| H1947 H * | 3/2001 | Starrett .................. 463/47.7 |
| 6,883,264 B1 * | 4/2005 | Gimbel ....................... 43/6 |

* cited by examiner

*Primary Examiner*—William M Pierce
(74) *Attorney, Agent, or Firm*—Kelley Drye & Warren, LLP (57) ABSTRACT

A shark deterrent device is disclosed. The device comprises at least two hollow cylindrical shafts, a tip, a twist-release mechanism, and at least one self-lock mechanism. The tip may be replaceable. The shark deterrent device is a retractable unit that is easy for a diver to carry and stow, and yet can be extended in order to deter a shark. The device is unlocked from its retracted position by twisting a collar, thereby unlocking the concentric shafts and allowing the unit to be fully extendable by hand. Once the unit is fully extended, a self-lock mechanism lock the unit to prevent it from retracting during use. The unit has a handle formed at one end of the outermost cylindrical shaft and a tip at the opposing end of the innermost cylindrical shaft. The tip may be replaceable and removed, and other useful tips may be attached.

14 Claims, 11 Drawing Sheets

SHARK DETERRENT DEVICE

CROSS-REFERENCE TO RELATED APPLICATIONS

The present invention relates to, is entitled to the benefit of the earlier filing date and priority of, and is a Continuation-in-Part of application Ser. No. 10/959,120, filed on Oct. 7, 2004, now abandoned that relates to, and is entitled to the benefit of the earlier filing date and priority of, Application No. 60/508,873, filed on Oct. 7, 2003, which are herein incorporated by reference as if fully set forth.

FIELD OF THE INVENTION

The present invention relates to a device for deterring shark attacks. In particular, the device provides the user with a telescopic blunt object with which to prevent a shark from coming too close, while reducing the potential for injury to the shark.

BACKGROUND OF THE INVENTION

Shark attacks are a common fear of scuba divers. In order to prevent these attacks, divers often carry with them various shark deterrents, such as chemical repellents or spear guns. Chemical repellents are often not allowed in ecological fragile areas, and are often of only limited effectiveness.

Spear guns are quite large to carry and are often not allowed in certain dive areas. It is typically only necessary to ward off the shark rather than injure it with a device such as a spear gun. An injury resulting in a loss of blood from the shark will likely attract other sharks and would pose an additional threat to the diver. It may be sufficient to prod, bump, or strike the shark when it advances with a device according to an embodiment of the present invention.

Sharks rarely attack in a straight forward manner. The most common method of shark attack is known as a "circling attack." A circling attack is when a shark starts to circle its prey widely, and gradually reduces the diameter of the circle until the shark is close enough to "bump" its snout into the prey. This "bump" allows the shark to use its electroreceptors to identify its prey before the "test bite." Since sharks are known to be scavengers they often are attracted to an easy prey. When sharks encounter prey that fights back, they have been known to retreat.

Thus, there is a need in the industry for a non-chemical, non-wounding device that will deter sharks and yet is easy for a diver to carry and open. This device may be used when a shark attempts to approach or "bump" a diver, acting as a deterrent and causing the shark to retreat and leave the diver in search of easier prey.

SUMMARY OF THE INVENTION

Responsive to the foregoing challenges, Applicant has developed an innovative device for deterring sharks. The device is comprised of at least two, and in one embodiment three hollow shafts that may be cylindrical, a replaceable and/or interchangeable tip, a spring disposed in at least one hollow shaft to partially extend or open the device; a twist-release, or similar release, mechanism, and at least one, and in one embodiment, two self-lock mechanisms. The shark deterrent is a retractable unit that is easy for a diver to carry and stow, and yet can be easily extended in order to deter a shark. The device is unlocked from its retracted position by twisting a collar or using a similar release mechanism, thereby unlocking the concentric shafts and allowing the spring to partially or fully extend the device, and if necessary the device may then be fully extended by hand. Once the unit is fully extended, self-lock mechanisms lock the unit to prevent it from retracting during use. The unit has a handle formed at one end of the outermost shaft and a replaceable and/or interchangeable tip at the opposing end of the innermost shaft. The replaceable tip may be removed, and other useful tips may be attached. In various embodiments, the interchangeable tips may include, but are not limited to, a hook, a spear, a net, a flashlight, a Light Emitting Diode (LED), or a shovel. In some embodiments the apparatus may include a spring or other similar mechanism to partially or fully extend at least one of the concentric shafts upon release from the retracted position.

It is to be understood that both the foregoing general description and the following detailed description are exemplary and explanatory only, and are not restrictive of the invention as claimed. The accompanying drawings, which are incorporated herein by reference, and which constitute a part of this specification, illustrate certain embodiments of the invention and, together with the detailed description, serve to explain the principles of the present invention.

BRIEF DESCRIPTION OF THE DRAWINGS

In order to assist in the understanding of this invention, reference will now be made to the appended drawings, in which like reference characters refer to like elements.

DETAILED DESCRIPTION OF THE EMBODIMENTS OF THE INVENTION

Reference will now be made in detail to embodiments of the present invention, examples of which are illustrated in the accompanying drawings. As embodied herein, the present invention is a diver's utility tool, one embodiment of which is a shark deterrent device.

Figure 1:
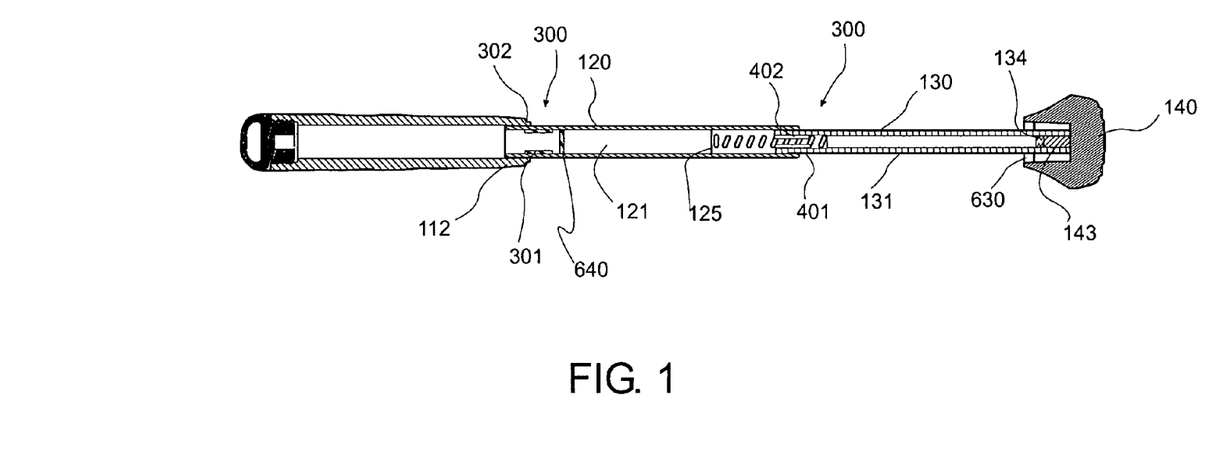
FIG. 1 is a cross-section of an embodiment of the present invention in an extended position having a spring disposed in the second concentric shaft.

An embodiment of the present invention is shown in FIG. 1 as a shark deterrent device 10. The shark deterrent device comprises at least one shaft, and the shaft may be cylindrical. As shown in FIG. 1, one embodiment of device 10 comprises three cylindrical shafts, first hollow cylindrical shaft 110, second hollow cylindrical shaft 120, third hollow cylindrical shaft 130, and tip 140. Embodiments of the present invention may include, but are not limited to, one, two, or three or more cylindrical shafts. Discussion of a proximal end or portion indicates the end or portion closest to the operator, and discussion of a distal end or portion indicates the end or portion away from the operator.

Figure 2:
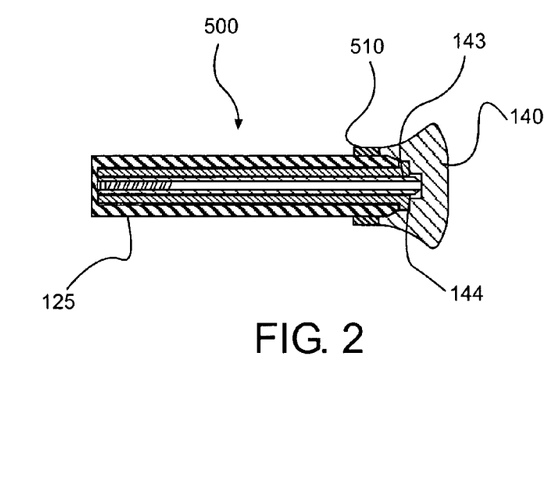
FIG. 2 is a cross-section of an embodiment of the present invention in a retracted position.

With reference to FIGS. 1 and 2, in one embodiment a first hollow cylindrical shaft 110 comprises closed proximal end 113, open distal end 112, and first internal cavity 111. First hollow cylindrical shaft 110 has second hollow cylindrical shaft 120 slideably disposed within first internal cavity 111. Second hollow cylindrical shaft 120 likewise has third hollow cylindrical shaft 130 slideably disposed within second internal cavity 121. This arrangement allows a telescopic action of the device, thereby enabling it to retract and extend. FIG. 1 shows the device in a fully extended position while FIG. 2 shows the device in a fully retracted position. Replaceable tip 140 is attached to the distal end of third hollow cylindrical shaft 130. Tip 140 includes post 143. Distal end of post 143 is attached to the center of the internal surface of tip 140. Screw thread 134 disposed on the internal wall of the distal end of third hollow cylindrical shaft 130 operably engages screw thread 144 disposed on post 143 of tip 140. As shown in FIGS. 1 and 2, spring 125 is disposed in internal cavity 121 of second hollow shaft 120. The proximal end of spring 125 may abut partition 640 disposed in the proximal portion of second hollow shaft 120 when device 10 is in the retracted or closed position. The distal end of spring 125 abuts the proximal end of third hollow shaft 130. In this embodiment spring 125 moves with third hollow shaft 130 when device 10 is opened or extended. Spring 125 is in a more relaxed state when device 10 is in an open or extended position, and is in a compressed state when device 10 is closed or retracted.

Figure 3:
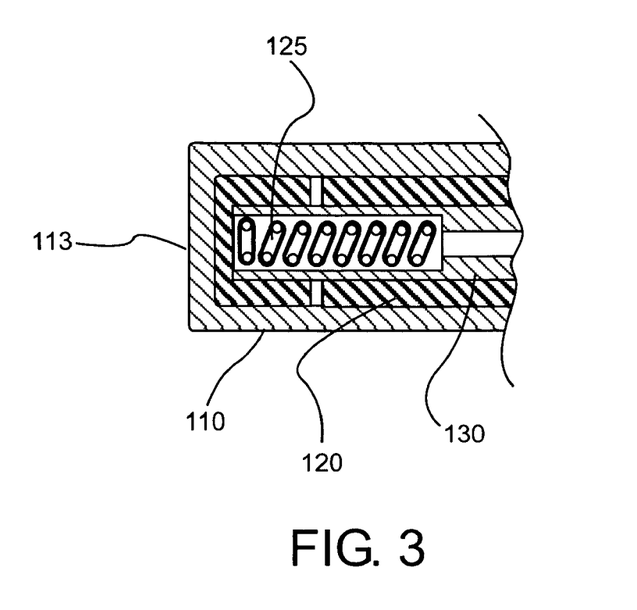
FIG. 3 is a cross-section detail view of an embodiment of the handle end of the present invention, when the embodiment is in a retracted position.

FIG. 3 is a detail view of an embodiment of device 10 wherein spring 125 is compressed when device 10 is in a fully retracted position.

Figure 4:
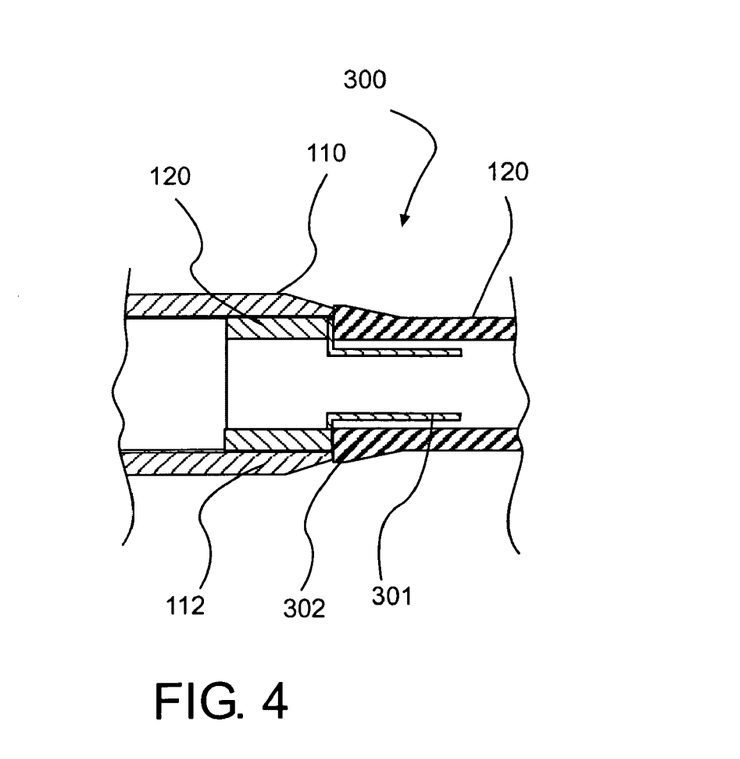
FIG. 4 is a cross-section detail view of the self-lock mechanism according to an embodiment of the present invention.

FIG. 4 is a detail view of a self-lock feature 300. To prevent the device from retracting during use, self-lock feature 300 is used. Self-lock feature 300 may include at least one shoulder 302 disposed on second hollow cylindrical shaft 120. When second hollow cylindrical shaft 120 is extended its full open position from first internal cavity 111 of first hollow cylindrical shaft 110, shoulder 302 will slide out of first internal cavity 111, expand radially, and butt against open end 112 of first hollow cylindrical shaft 110. Shoulder 302 is biased radially outward from second internal cavity 121 such that when shoulder 302 exits open end 112 it moves radially outward preventing shoulder 302 from being able to retract back into first internal cavity 111. Shoulder 302 may be attached to the exterior surface of second hollow shaft 120 near the proximal end of shaft 120, or shoulder 302 may be a unitary structure created by a cut-out portion of the surface of second hollow shaft 120 that is biased radially outward to engage open end 112 of first hollow shaft 110. In one embodiment cut-out 301 may be used to form shoulder 302. In an embodiment at least one shoulder 302 may be depressed inward to release shoulder 302 from open end 112 to allow second hollow shaft 120 to slide into internal cavity 111 of first hollow shaft 110.

Figure 5:
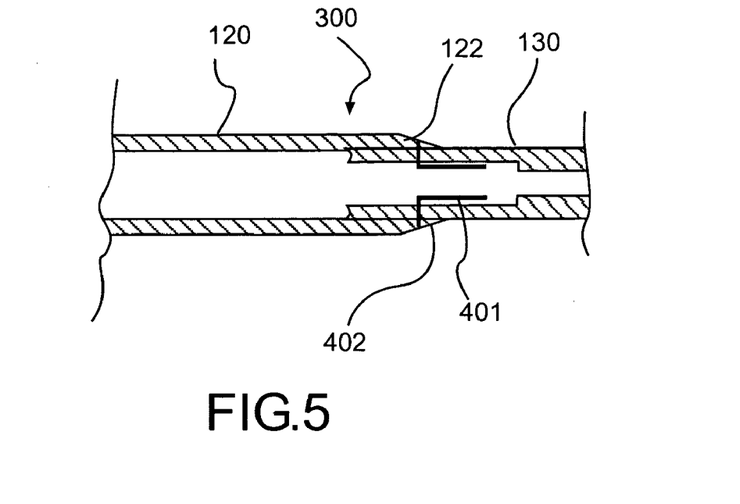
FIG. 5 is a cross-section detail view of the connection of the telescopic cylindrical shafts of an embodiment of the present invention.

FIG. 5 shows a detail of the connection between second hollow cylindrical shaft 120 and third hollow cylindrical shaft 130. Third hollow cylindrical shaft 130 is prevented from retracting fully into internal cavity 121 of second hollow cylindrical shaft 120 by self-lock 300. Self-lock 300 between second hollow shaft 120 and third hollow shaft 130 may operate in a similar manner to self-lock 300 between second hollow shaft 120 and first hollow shaft 110. Self-lock 300 may include a shoulder 402 on third hollow cylindrical shaft 130. When third hollow cylindrical shaft 130 is extended its full open position from second internal cavity 121 of second hollow cylindrical shaft 120, shoulder 402 will slide out of second internal cavity 121 and butt against distal end 122 of second hollow cylindrical shaft 120. Shoulder 402 is biased radially outward from third internal cavity 131 such that when shoulder 402 exits distal end 122 it moves radially outward preventing shoulder 402 from being able to retract back into second internal cavity 121. Shoulder 402 may be formed in the same manner as previously disclosed for shoulder 301. Cut-out 401 may be used to form shoulder 402.

Figure 6:
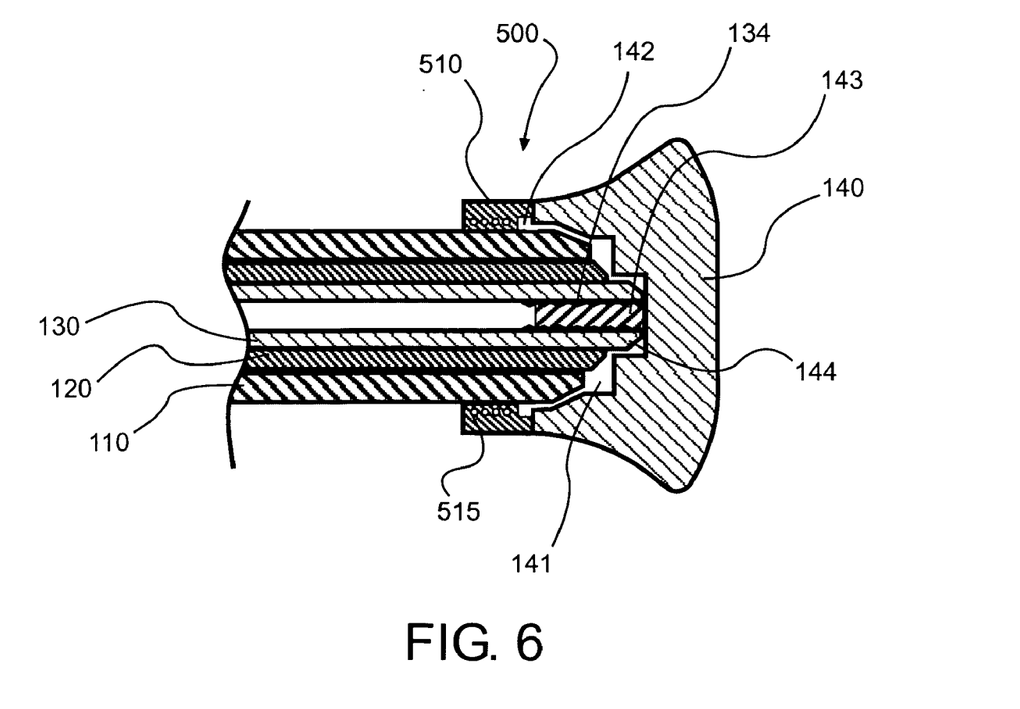
FIG. 6 is a cross-section of one embodiment of a replaceable tip for an embodiment of the present invention.

FIG. 6 shows replaceable tip 140 in relation to first, second, and third hollow cylindrical shafts 110, 120, and 130, respectively. Replaceable tip 140 is attached to one end of third hollow cylindrical shaft 130 in such a manner as to allow it to be easily removed and replaced with a second tip by an operator. In one embodiment threaded post 143 of tip 140 comprises thread 144 on its external surface that operably screws into and engages thread 134 disposed on the interior surface of the distal end of third hollow shaft 130. Replaceable tip 140 includes cavity 141 which allows replaceable tip 140 to collapse over first hollow cylindrical shaft 110, second hollow cylindrical shaft 120, and third hollow cylindrical shaft 130 when the device is in its retracted state. Replaceable tip 140 may also include protrusions 142, which may be engaged collar 510 of twist-release mechanism 500 to prevent the device from extending until so desired.

Figure 7:
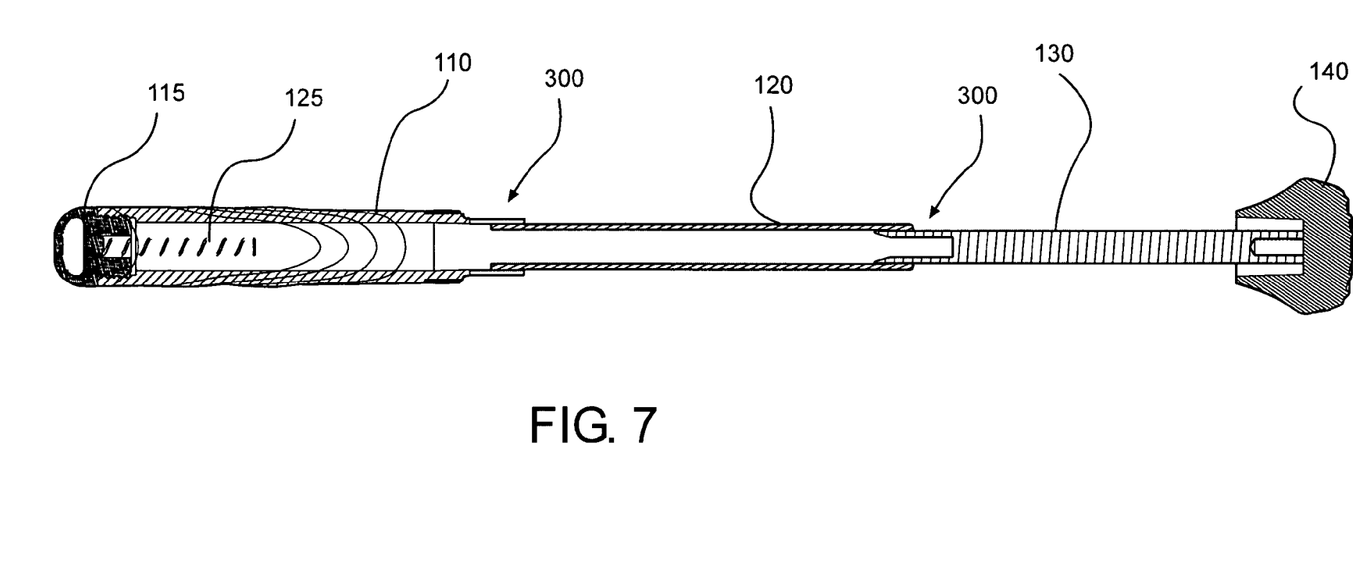
FIG. 7 is a cross-section of an embodiment of the present invention in its extended position having a spring disposed in the handle.

Twist-release mechanism 500 is positioned and rotatably fixed on the outside surface of first hollow cylindrical shaft 110. Twist-release mechanism 500 may include collar 510 that engages and locks onto protrusions 142 of tip 140, thereby preventing device 10 from extending. When twist-release mechanism 500 is not released, spring 125 is prevented from partially or fully extending third hollow cylindrical shaft 130 out of first hollow cylindrical shaft 110 and second hollow cylindrical shaft 120. When collar 510 is rotated to an unlock position, the bias of spring 125 pushes third hollow cylindrical shaft 130 partially out of first hollow cylindrical shaft 110 and/or second hollow cylindrical shaft 120. The device is then unlocked, and a user can fully extend the device by hand. Collar 510 is biased by a torsion spring 515 such that when an operator releases collar 510, it returns to its original position, thereby re-engaging shoulders 142 when the device is retracted and re-locking the device in a closed position. As shown in FIG. 7, spring 125 may alternatively be disposed in the proximal end of first hollow cylinder 110 with the proximal end of spring 125 in contact with closed end 113. In an alternative embodiment as shown closed end 113 may comprise end plug 115 that may threadably engage with the proximal end of the interior surface of first hollow shaft 110. End plug 115 may be used to secure the proximal end of spring 125. In an alternative embodiment, the distal end of spring 125 may be secured to the proximal end of third hollow tube 130, wherein spring 125 moves with third hollow shaft 130 when device 10 is extended, as shown in FIG. 1. End plug 115 is designed to be removable and may be manufactured of various densities of material, such as plastic. Various densities of end plug 115 may be achieved by incorporating a predetermined density and size of microspheres in the final composition of the plastic. The microspheres may be filled with materials including, but limited to, air, various other inert gases, fluid, or metal, as is well known in the art. By selecting a certain density of end plug 115, device 10 may be made neutrally buoyant at predetermined depths.

Figure 8:
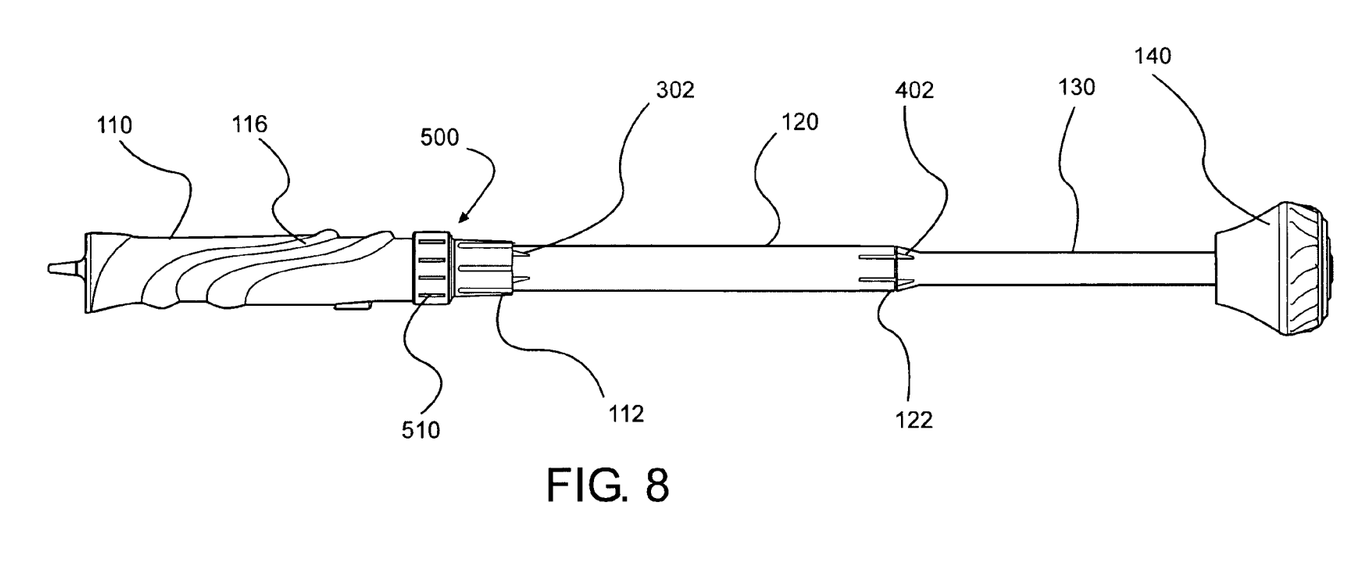
FIG. 8 is a plane view of an embodiment of the present invention in its extended position.
Figure 9:
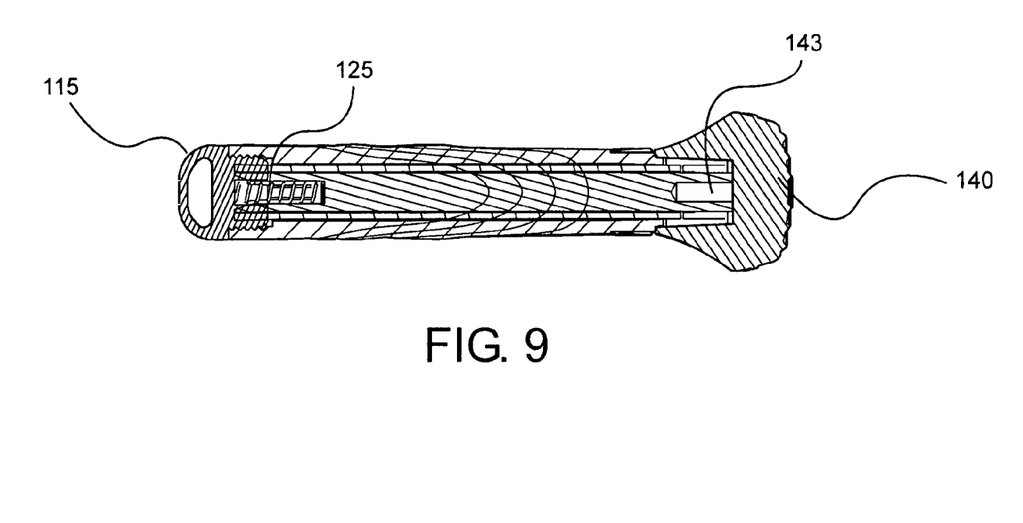
FIG. 9 is a cross-section detail view of an embodiment of the handle end of the present invention when the present invention is in a retracted position.

With reference to FIG. 8, a plane view of one embodiment of the present invention is illustrated, wherein the distal ends of first hollow shaft 110 and second hollow shaft 120 are slotted to assist in extending and retracting device 10. Also shown is an embodiment of shoulder 302 of first hollow shaft 110 and second shoulder 402 of second hollow shaft 120 wherein first shoulder 302 and second shoulder 402 are formed from a unitary portion of first hollow shaft 110 and second hollow shaft 120. FIG. 9 shows one embodiment of the present invention in a closed or retracted position.

Figure 10:
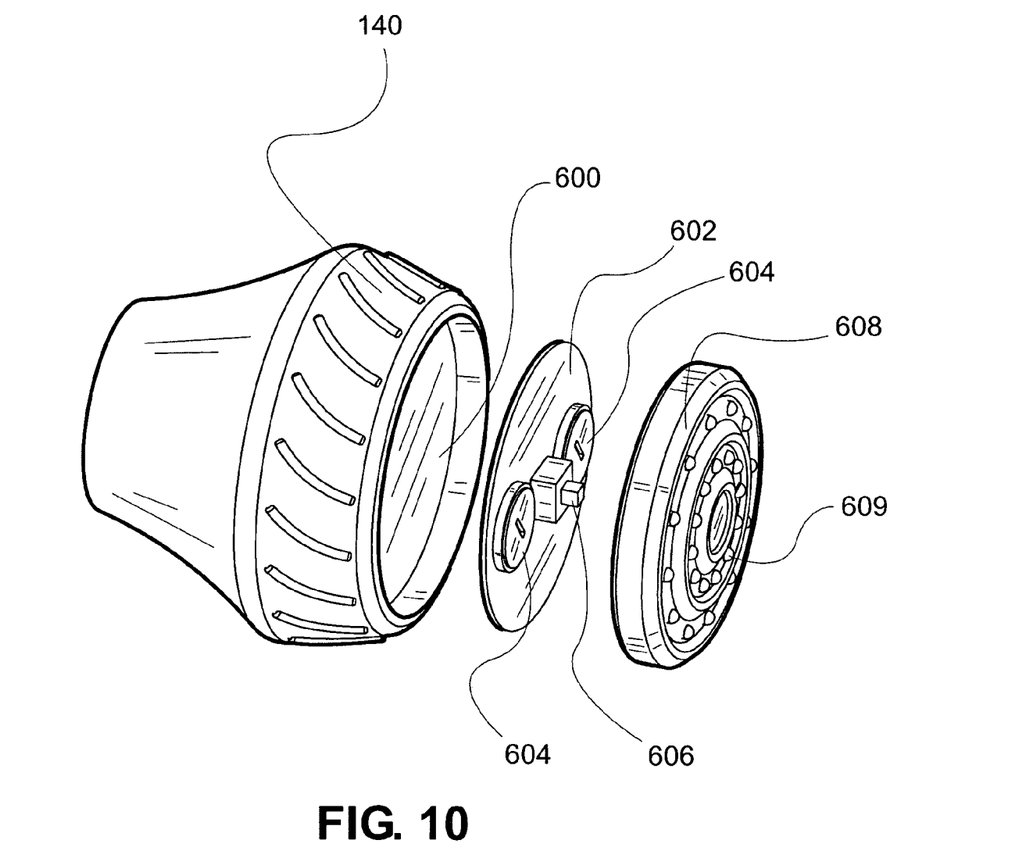
FIG. 10 is an exploded view of a tip including an LED according to one embodiment of the present invention.
Figure 11:
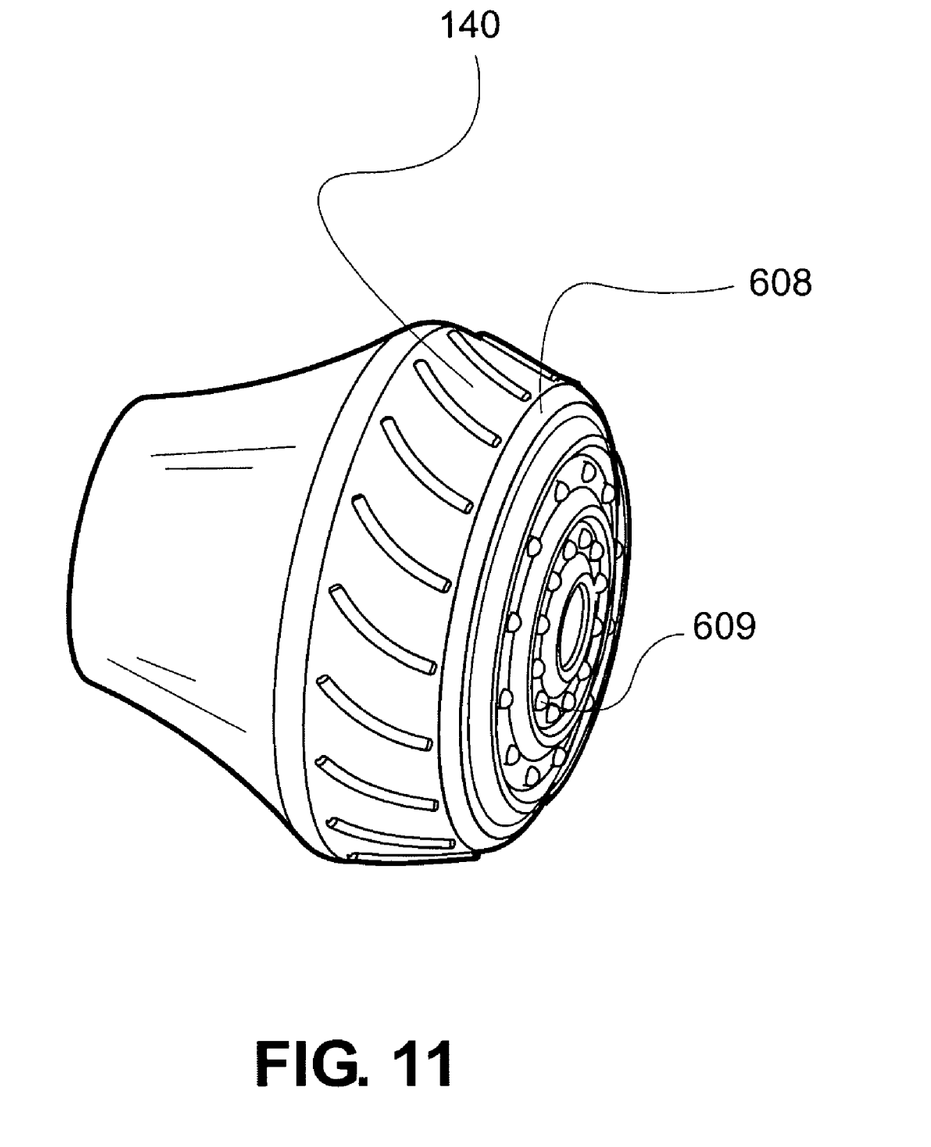
FIG. 11 is a plane view of a tip including an LED according to one embodiment of the present invention.

FIG. 10 shows tip 140 in one embodiment of the present invention. Tip 140 may include cavity 600 for use in housing a flashlight or LED. In one embodiment cavity 600 may be fitted with rear light casing 602. Battery 604, such as, but not limited to, a lithium ion battery, is attached to the distal side of rear casing 602. Switch 606, such as, but not limited to, a push button switch is also attached to rear housing 602. LED 609 are disposed within front light casing 608. Tip 140, rear housing 602, and front housing 608 may be sealed to protect battery 604 and switch 606 from water. Momentary depression of all or a portion of front housing 608 activates switch 606 and LED 609. FIG. 11 shows an assembled view of an alternative embodiment of tip 140 including an LED assembly.

Figure 12:
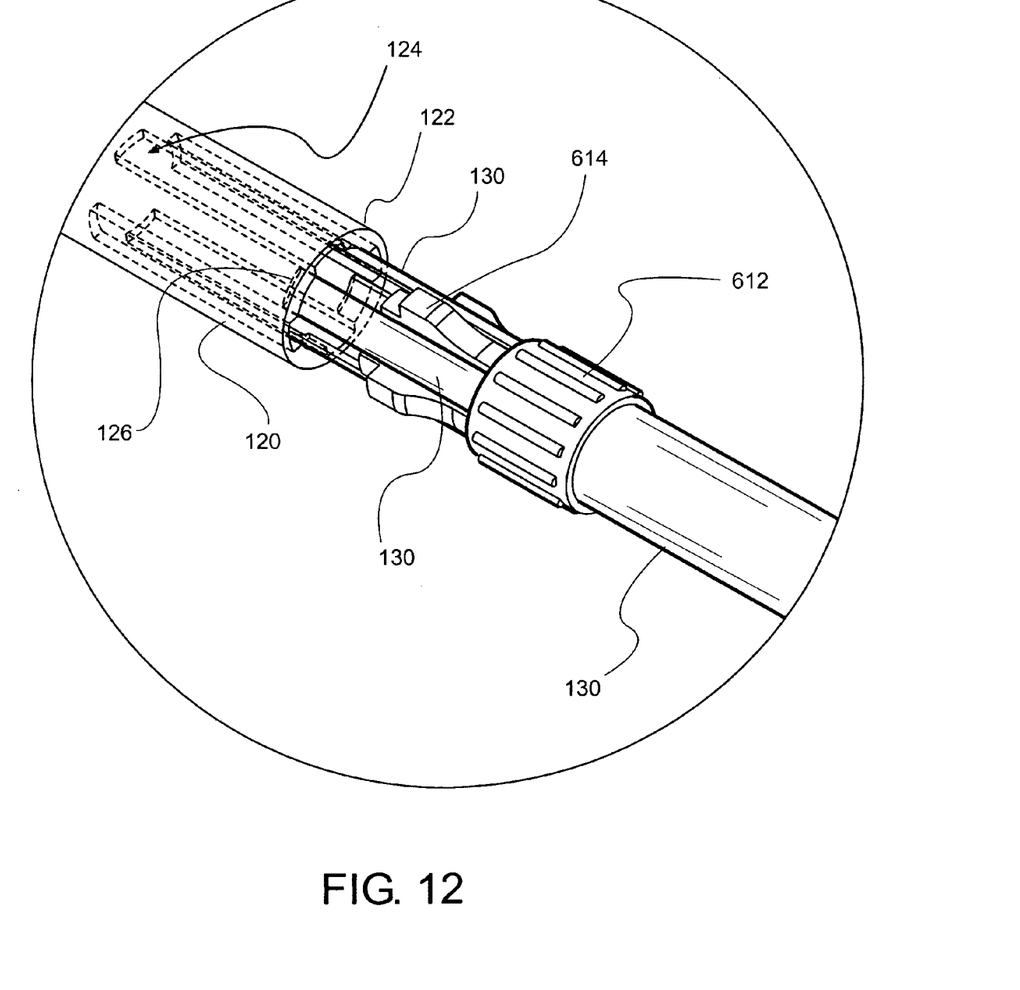
FIG. 12 is an expanded plane view of an embodiment of the self-lock mechanism according to one embodiment of the present invention.
Figure 13:
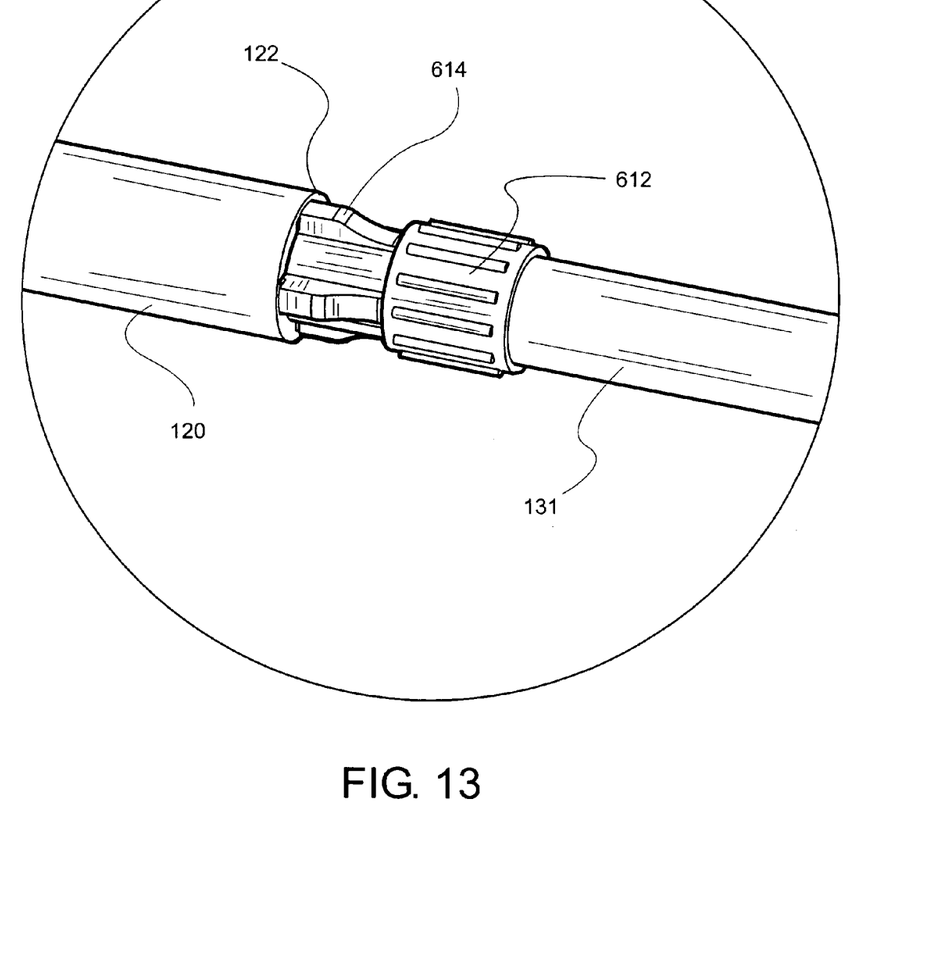
FIG. 13 is a plane view of an embodiment of the self-lock mechanism according to one embodiment of the present invention.
Figure 14:
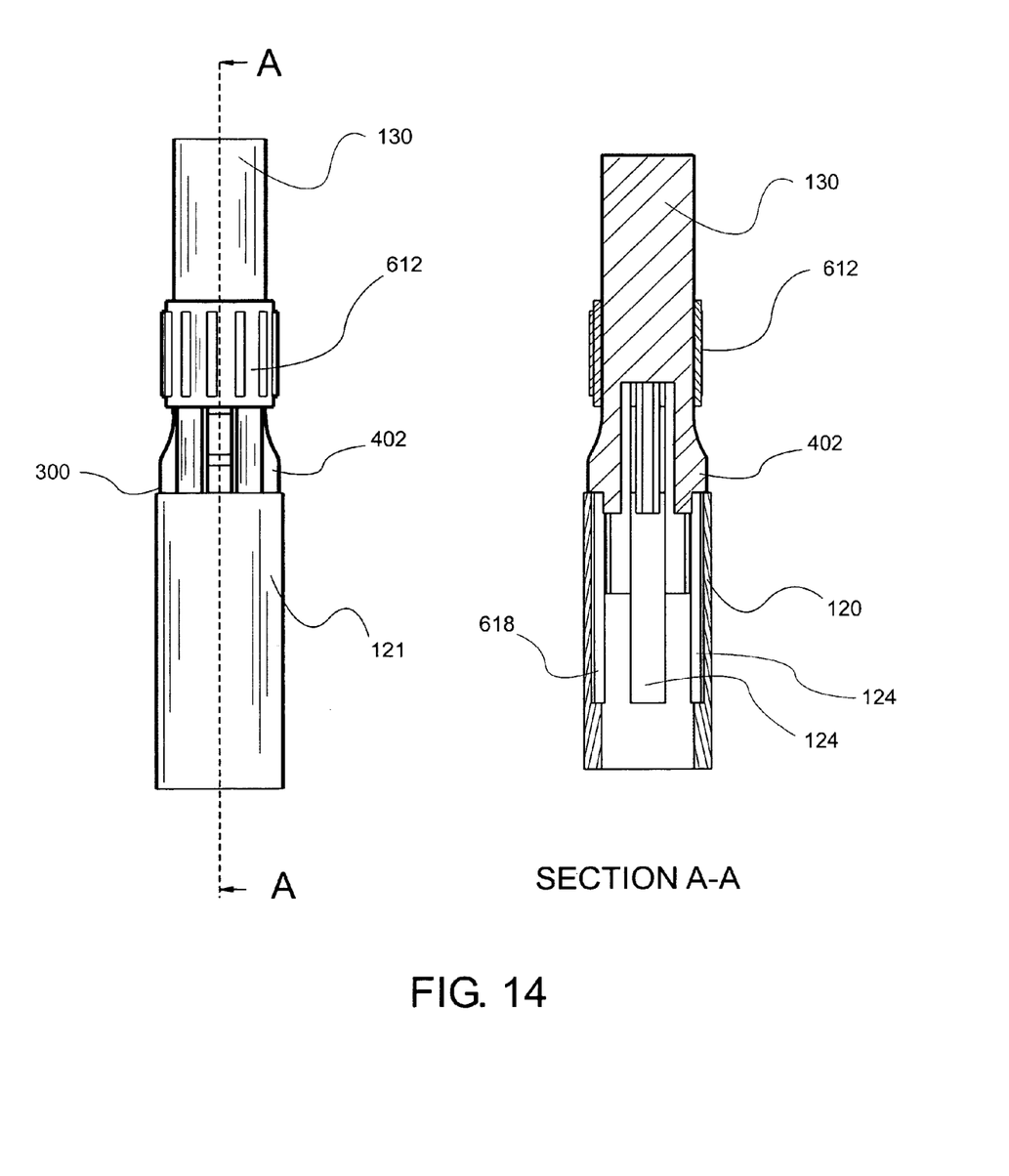
FIG. 14 is a plane and cross-section view of the self-lock mechanism according to one embodiment of the present invention.

FIGS. 12, 13, and 14 show one embodiment of self-lock 300, and for purposes of example only, self lock 300 is shown in conjunction with third hollow shaft 130 and second hollow shaft 120. Self-lock 300 may also be used in conjunction with second hollow shaft 120 and first hollow shaft 110. Shoulder 402 disposed on near the proximal end of third hollow shaft 130 is biased radially outward. Annular grove 124 formed in the distal end of second hollow shaft 120 slidably engages shoulder 402. Third hollow shaft 130 may also include a lip 126 disposed at its proximal end to prevent over-extension of third hollow shaft 130 from second hollow shaft 120. One embodiment may include release ring 612 slidably mounted around the circumference of third hollow shaft 130. When release ring 612 is moved toward the proximal end of hollow shaft 130, release ring 612 slidably engages and depresses shoulder 402 to allow shoulder 402 to slide into annular groove 124. Release ring 612 may be formed with a wider proximal opening and a narrower distal opening to permit the depression of shoulder 402 and shoulder 302 during retraction or closing of device 10.

FIG. 12 shows one embodiment with third hollow shaft 130 over-extended from second hollow shaft 120 for purposes of clarity in viewing components of self-lock 300. FIG. 13 shows shoulder 402 abutting open end 122 in and open or extended position. Release ring 612 is near the proximal end of third hollow tube 130 in preparation for retraction of device 10. FIG. 14 shows another view of one embodiment of the present invention and self-lock 300.

Figure 15:
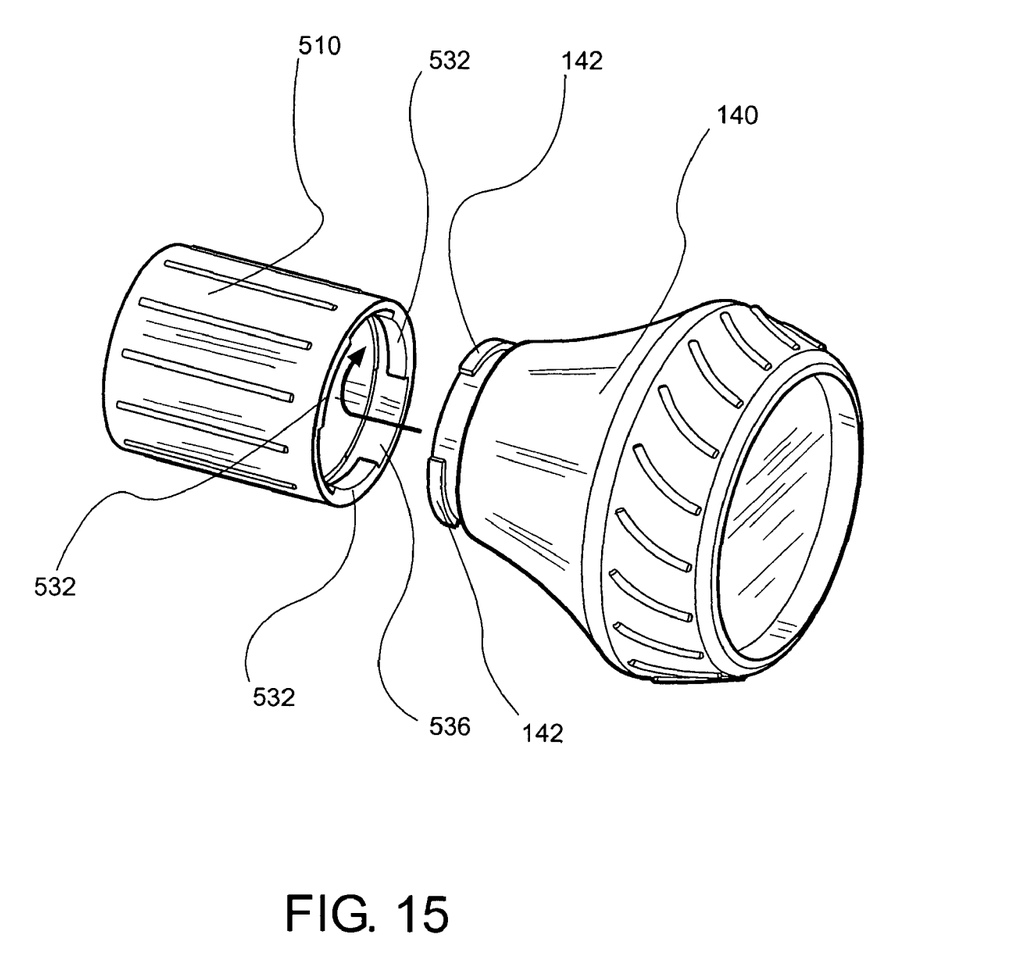
FIG. 15 is a plane view of the twist release mechanism according to one embodiment of the present invention.

FIG. 15 shows one embodiment of twist-release mechanism 500. First, second, and third hollow shafts are omitted for clarity. Protrusion 142 disposed on a portion of the outer circumference of the proximal end of tip 140 is designed to be slidably disposed into slot 532. Slot 532 is disposed on a portion of the distal end of collar 510. Once protrusion 142 is inserted into slot 532, collar 510 may be rotated such that retainer tab 536 engages protrusion 142 and secures device 10 in a closed or retracted position.

With reference to FIGS. 1-15, the operation of one embodiment of device 10 will now be explained. To extend device 10, the operator twists collar 510 against the bias of optional torsion spring 515, thereby unlocking device 10. Third hollow cylindrical shaft 130 is then forced out of first hollow cylindrical shaft 110 and second hollow cylindrical shaft 120 by the bias of spring 125. The operator then can grasp a portion of third hollow shaft 130 and extend device 10 to its full length. Upon reaching its full length, self-lock 300 locks device 10 in its extended position. To close device 10 the operator first pushes in on shoulder 302 and 402, and slides third hollow cylindrical shaft 130 into second hollow cylindrical shaft 120, and second hollow cylindrical shaft 120 into first hollow cylindrical shaft 110. When first, second, and third hollow cylindrical shafts 110, 120, and 130, respectively, are in the fully retracted position, collar 510 under the bias of optional torsion spring 515, automatically locks again over protrusion 142.

It will be apparent to those skilled in the art that variations and modifications of the present invention can be made without departing from the scope or spirit of the invention. Thus, it is intended that the present invention cover all such modifications and variations of the invention, provided they come within the scope of the appended claims and their equivalents.

What is claimed is:

1. A shark deterrent device comprising:
   first and second concentric hollow shafts, each with a proximal end and a distal end, wherein the second shaft is slidably disposed within the first shaft and the shafts capable of telescopic extension;
   a self-lock mechanism disposed adjacent to the proximal end of the second shaft, the self lock mechanism comprising a radially expanding shoulder operable to exit the distal end of the first shaft, radially expand, abut an open end of the first shaft, and lock the first and second shafts in an extended position;
   a release ring slidably mounted around a circumference of the second hollow shaft operable to engage a surface and depress the radially expanding shoulder allowing it slide into the first hollow shaft;
   a tip, attached to the distal end of one of the hollow shafts; and
   a spring disposed in one of the hollow shafts.

2. The shark deterrent device of claim 1, wherein the tip is blunt.

3. The shark deterrent device of claim 1, wherein the tip incorporates a light.

4. The shark deterrent device of claim 1, wherein the tip is rubber.

5. The shark deterrent device of claim 1, wherein the tip is removable.

6. The shark deterrent device of claim 1, comprising a molded plastic end plug removably engaged to the proximal end of the first shaft, wherein the plug is selected from at least two plugs having different densities, wherein selection of the density of the plug and engagement of the plug to the first shaft enables the device to be neutrally buoyant at a predetermined depth.

7. The shark deterrent device of claim 1, comprising:
a twist-release mechanism, operable to unlock the first and second concentric hollow concentric shafts from a retracted position.

8. A shark deterrent device comprising:
a first hollow shaft having a proximal and a distal end;
a second hollow shaft, having a proximal and a distal end, and slidably disposed within the first hollow shaft;
a twist-release mechanism, operable to release the concentric shafts and enable the shafts to slide;
a first self-lock mechanism disposed adjacent to the proximal end of the second shaft, the self lock mechanism comprising a radially expanding shoulder operable to exit the distal end of the first shaft, radially expand, abut an open end of the first shaft, and lock the first and second shafts in an extended position preventing the second hollow shaft from retracting into the first hollow shaft; and
a release ring slidably mounted around a circumference of the second hollow shaft operable to engage a surface and depress the radially expanding shoulder allowing it slide into the first hollow shaft;
a tip attached to one of the hollow shafts.

9. The shark deterrent device of claim 8, further comprising a third hollow shaft, slidably disposed within the second hollow shaft.

10. The shark deterrent device of claim 9, further comprising a second self-lock, operable to lock the third hollow shaft and the second hollow shaft in an extended position preventing the third hollow shaft from retracting into the second hollow shaft.

11. The shark deterrent device of claim 8, further comprising a spring disposed in one of the hollow shafts operable to partially extend the shark deterrent device.

12. The shark deterrent device of claim 8, comprising a molded plastic end plug removably engaged to the proximal end of the first shaft, wherein the plug is selected from at least two plugs having different densities, wherein selection of the density of the plug and engagement of the plug to the first shaft enables the device to be neutrally buoyant at a predetermined depth.

13. A shark deterrent device comprising:
a first hollow cylindrical shaft having a proximal and a distal end;
a second hollow cylindrical shaft, having a proximal and a distal end, and slidably disposed within the first hollow cylindrical shaft;
a twist-release mechanism, operable to release the concentric shafts and enable the shafts to slide;
a first self-lock mechanism disposed adjacent to the proximal end of the second shaft, the self lock mechanism comprising a radially expanding shoulder operable to exit the distal end of the first shaft, radially expand, abut an open end of the first shaft, and lock the first and second shafts in an extended position preventing the second hollow cylindrical shaft from retracting into the first hollow cylindrical shaft;
a release ring slidably mounted around a circumference of the second hollow shaft operable to engage a surface and depress the radially expanding shoulder allowing it slide into the first hollow shaft;
a spring disposed in at least one of the first hollow cylindrical shaft and second hollow cylindrical shaft; and
a tip.

14. A shark deterrent device comprising:
a first hollow cylindrical shaft;
a second hollow cylindrical shaft, slidably disposed within the first hollow cylindrical shaft;
a third hollow cylindrical shaft, slidably disposed within the second hollow cylindrical shaft;
a twist-release mechanism, operable to release the concentric shafts and enable the shafts to slide;
a first self-lock mechanism disposed adjacent to the proximal end of the second shaft, the self lock mechanism comprising a radially expanding shoulder operable to exit the distal end of the first shaft, radially expand, abut an open end of the first shaft, and lock the first and second shafts in an extended position preventing the second hollow cylindrical shaft from retracting into the first hollow cylindrical shaft;
a second self-lock mechanism operable to lock the third hollow cylindrical shaft and the second hollow cylindrical shaft in an extended position preventing the third hollow cylindrical shaft from retracting into the second hollow cylindrical shaft; and
a release ring slidably mounted around a circumference of the third hollow shaft operable to engage a surface and depress the radially expanding shoulder allowing it slide into the second hollow shaft;
a replaceable tip.

* * * * *